United States Patent

[11] 3,566,135

| [72] | Inventor | Jacques Mouchart |
| | | L'Hay-les-Roses, France |
| [21] | Appl. No. | 782,950 |
| [22] | Filed | Dec. 11, 1968 |
| [45] | Patented | Feb. 23, 1971 |
| [73] | Assignee | Compagnie Generale d'Electricite, |
| | | Paris, France |
| [32] | Priority | Dec. 11, 1967 |
| [33] | | France |
| [31] | | 131,780 |

[54] OPTICAL CALIBRATING DEVICE FOR OBJECTS OF DIFFERENT HEIGHTS
10 Claims, 5 Drawing Figs.

[52] U.S. Cl.................................................. 250/219,
356/167, 250/223
[51] Int. Cl..................................................... G01b 11/02
[50] Field of Search........................................... 250/219
(Lg), 219 (Nd), 219 (Th); 250/209, 223; 356/156, 167; 250/234, 239; 350/164; 209/111.7; 250/216, 222

[56] References Cited
UNITED STATES PATENTS

| 1,770,497 | 7/1930 | Schroter...................... | 250/209 |
| 1,940,882 | 12/1933 | Rich............................ | 250/209 |
| 2,409,407 | 10/1946 | Turner........................ | 350/164 |
| 2,713,468 | 7/1955 | Distel.......................... | 250/239 |
| 2,978,591 | 4/1961 | Ringger....................... | 250/239 |
| 3,355,591 | 11/1967 | Pfeister....................... | 250/219 |
| 3,428,817 | 2/1969 | Hofmeister et al.......... | 250/219 |
| 3,458,704 | 7/1969 | Cath............................ | 250/209 |

FOREIGN PATENTS

| 1,012,014 | 1965 | Great Britain................ | 250/233 |

Primary Examiner—Walter Stolwein
Attorney—Sughrue, Rothwell, Mion, Zinn and Macpeak ABSTRACT: A group of fine monochromatic parallel beams which are disposed one above the other in a vertical plane are intercepted to a varying extent by objects of different height which pass through the beams. A photodetector system and associated logic circuits make it possible to calibrate the objects as a function of the number of beams intercepted.

3,566,135
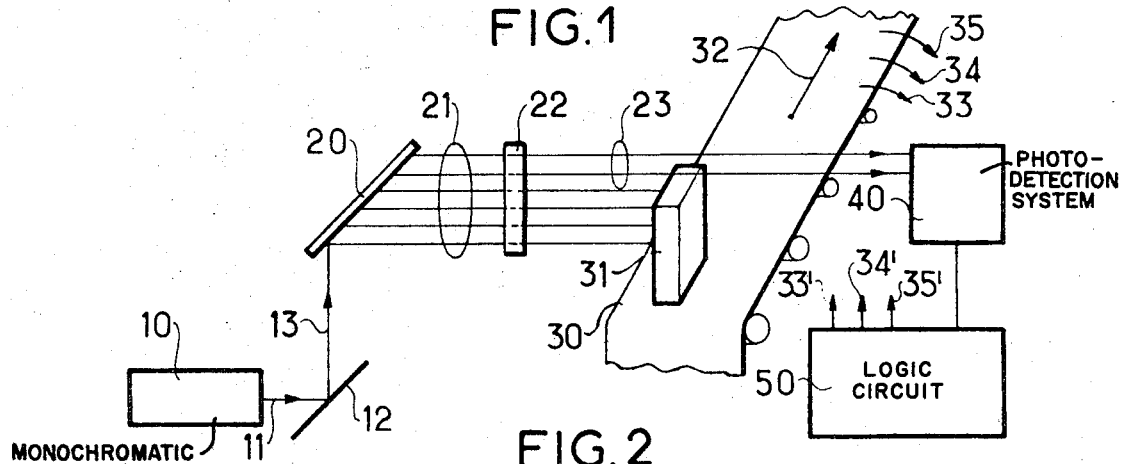
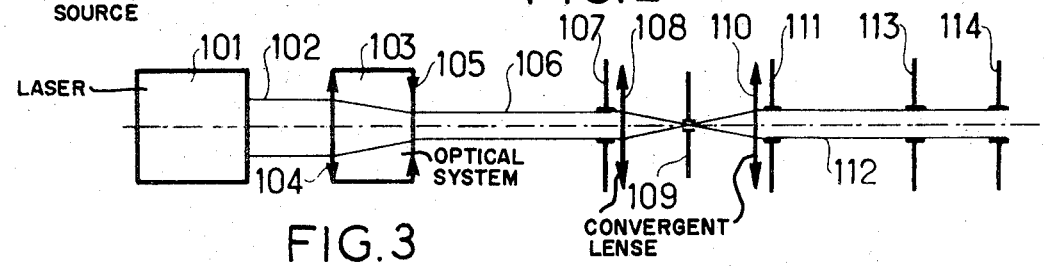
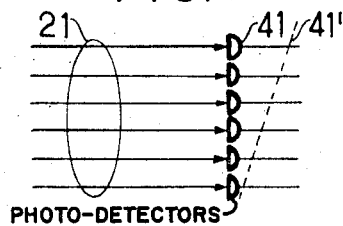
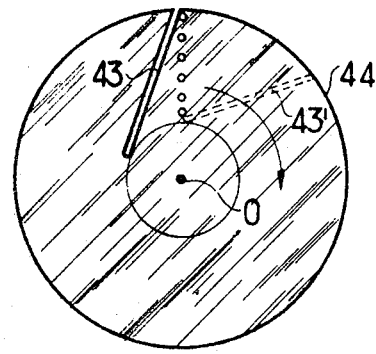
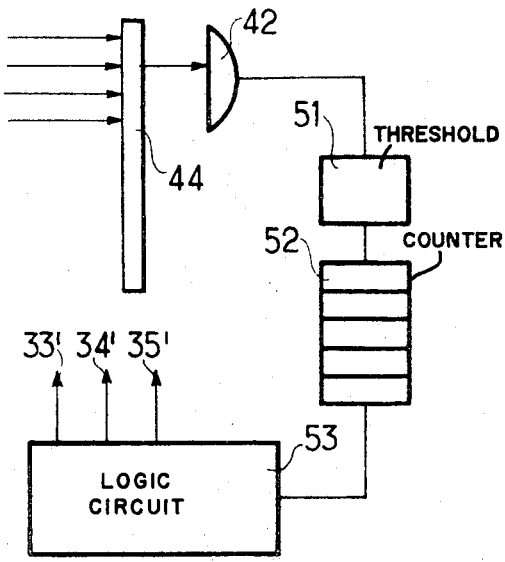

OPTICAL CALIBRATING DEVICE FOR OBJECTS OF DIFFERENT HEIGHTS

BACKGROUND OF THE INVENTION

The invention relates to a device for calibrating objects according to their linear dimensions by optical means. With this device it is possible to calibrate objects having lengths or heights that differ by only a relatively small quantity, for example, a few millimeters or a fraction of a millimeter. This device will permit these objects to be calibrated or separated into batches according to their linear dimensions.

SUMMARY OF THE INVENTION

The object of the present invention is to provide a device which utilizes a grid of light rays for the purpose of classifying objects having a minute difference in linear dimensions in the order of a few tenths of a millimeter to a few millimeters.

The invention consists basically of providing an optical system that is capable of generating a grid of fine, parallel and preferably equidistant light beams. Interception this grid of light beams is a system for transporting objects to be calibrated, this system passing the objects preferably perpendicular to the grid of light beams through the light beams to produce a pattern or signal on a photodetection system. The photodetection system is capable of supplying signal currents in correlation with the beams not occulted by the objects to be classified. A logic circuit or circuits are capable of responding to the signal generated by the photodetection system to segregate or remove the object from the transportation system into, for example, a container for collecting objects of a similar linear dimension.

BRIEF DESCRIPTION OF THE DRAWINGS

The invention will now be described in detail, by reference to the accompanying drawings, in which:

FIG. 1 is a diagrammatic view showing the arrangement of the optical calibrating device;

FIG. 2 is a detailed diagrammatic view of a generator of a cylindrical fine light beam;

FIG. 3 is a detailed diagrammatic view of a photodetection system corresponding to the first embodiment of the invention;

FIG. 4 is a detailed diagrammatic view of a photodetection system and a logic system according to the second embodiment; and FIG. 5 illustrates the rotating shutter which can be used in the optical system.

DETAILED DESCRIPTION OF THE INVENTION

In FIG. 1, a source 10 supplies a fine monochromatic beam 11 (for example, with a diameter with the order of 0.2 to 0.5 mm), which is deflected by a mirror 12 in a direction 13 toward a semitransparent planoparallel plate 20 which reflects a a grid of equidistant beams 21 spaced at intervals in the vertical direction. Since these beams all have an intensity which generally decreases according to the spacing in the vertical direction, it will generally be advantageous to give them all a more or less equal intensity by aligning them with respect to the weakest beam, for example, by means of a gradation device 22 such as an optical wedge or the like.

The desired spacing of the beams can be achieved by causing the mirror 12 and the plate 20 to rotate integrally about an axis perpendicular to the plane of the figure.

An object which is to be calibrated or classified according to its height is carried by conveyor 30 through the grid of equidistant, fine, parallel light beams 21 having approximately an equal intensity. As illustrated in FIG. 1 the object would travel in the direction of the arrow 32 and would block four beams out of the total of six beams in the grid.

The photodetection system 40 would supply electric currents current signals as a function of the number of beams 23 which pass over the object 31. These signal currents are received by a logic circuit 50, which can activate or open a corresponding gate or segregating means 33, 34 or 35. The provision of a threshold member in the input of the logic circuits 50 would advantageously eliminate the effect of any stray light. It would be possible to use an intensity-modulated light beam.

A system for generating a cylindrical monochromatic beam is illustrated in FIG. 2 where a laser 101, which has the characteristic or of emitting a high power at a very small solid angle, can be the source of monochromatic light. The substantially parallel light beam 102 emitted by the laser 101 passes through an optical system 103 to reduce the dimensions of the beam 102. The optical system 103 can be formed by a two lens system one of which is convergent (104) and the other divergent (105), to enable the dimensions of the beam 102 to be reduced in a ratio of 2 to 4 and reduce the divergence of the laser beam. The ratio of 2 to 4 is a maximum for the lasers currently employed. The beam 106 then passes through an afocal system of magnification of 1, formed by two groups of convergent lenses 108 and 110 of equal focal length $f$, limited by identical diaphragms 107 and 111. Another diaphragm 109 is positioned at the common focus of the optical systems 108 and 110. If the diaphragms 107 and 111 are within the limit permitted by the diffraction, the beam 112 leaving the diaphragm 111 will be parallel over a length $2f$ where $f$ is the focal length of the lenses 108 and 110.

To illustrate the optical system, a laser of 6328 A. (beam 102) with a diameter of 2 mm., having an focal system 103 of ratio 4, will produce a beam 106 of the order of 0.5 mm. diameter. With a focal length $f$ equal to 100 mm. and diaphragms 107 and 111 being 0.5 mm. the parallel light beam 112 transmitted will have a diameter of 0.5 mm. over a length of 200 mm. To remove the effects of any stray light on the receiver, it is advantageous to position a diaphragm 113 at about $2f$ from the diaphragm 111 and a further diaphragm 114 close to the receiver 40 (FIG. 1).

With a plate 20 (FIG. 1) of suitable dimensions, it is possible using the same laser beam of a wavelength of 6328 A., to have beams with a diameter of 0.5 mm. and spaced from each other by 1.5 mm. In order to obtain beams of smaller dimensions, it would only be necessary to reduce the focal length $f$ and the wavelength of the source.

FIG. 3 illustrates an embodiment of the invention that utilizes a small photodetectors. The photodetectors 41 would be of a small dimension and receive only one each of the parallel beams of the group 21. It would be possible to increase the power resolution of this arrangement of small photodetectors by inclining the alignment of the photodetectors with respect to a perpendicular to the beams 21, as indicated in FIG. 3 by the broken line at 41'.

Another embodiment of the present invention uses a rotating shutter 44 as illustrated in FIG. 4. The rotating shutter as illustrated in FIG. 5 includes a slanted nonradial slot which is capable of cutting the nonocculted beams received by the photoelectric cell 42 of a normal dimension. The fragmented or cut beams can be counted behind a threshold member 51 in a counter 52, which will feed a signal to the logic circuit 53 which in turn will operate the appropriate segregating means for corresponding gates 33, 34 or 35 for the classification or calibration of the object. The rotating shutter 44 is shown in FIG. 5 in the form of an opaque disc 44 turning about its center O and formed with a nonradial slot 43 which, passing from the position 43 to the position 43' when the disc turns, will successively uncover the transmitted light beams. As mentioned above the successive arrival of the nonocculted beams at the counter 52 produces a countable pattern. The rotating shutter could consist of a cut metal sheet or even of a glass covered with an opaque deposit on which a groove is formed.

The second embodiment is capable of a high separating power which would only be limited by the qualities of the source and the defraction phenomena. This arrangement can in particular be applied to the calibration of bottles in an automatic bottle-sealing system.

I claim:

1. A device for calibrating and segregating an object according to a linear dimension comprising; means for producing a monochromatic light beam; a mirror; a semitransparent planoparallel plate, the mirror deflecting the monochromatic light beam onto the semitransparent planoparallel plate which reemits a grid of small parallel light beams; means for transporting the object to be calibrated through the light beam grid; a photodetection means which supplies an electric current signal in correlation with the beams not occulted by the object; logic means responsive to the photodetection means to provide a signal in response to the physical dimensions of the object; and means for segregating the object in response to the signal from the logic means.

2. A device as in claim 1 wherein the light beam is a monochromatic laser beam and the grid is formed of small parallel laser beams at equal distances.

3. A device as in claim 2 where the means for producing a monochromatic laser beam includes lens means for reducing the divergence of the laser beam and a convergent lens means for providing a parallel beam.

4. A device as in claim 1 wherein the mirror and plate can turn integrally about an axis parallel to their planes.

5. A device as in claim 1 wherein the different light beams are made approximately equal in amplitude by an optical wedge.

6. A device as in claim 1 wherein a threshold member is in circuit with the photodetector means.

7. A device as in claim 1 wherein the photodetector means includes an alignment of photodetectors of small dimensions.

8. A device as in claim 7 wherein the alignment of the photodetector means is inclined on the perpendicular to the direction of the beam.

9. A device as in claim 1 wherein the photodetector means is a cell of normal dimensions positioned behind a rotating shutter which successively allows the nonocculted beams to pass and includes a counter capable of counting the passed beams.

10. A device as in claim 9 wherein the rotating shutter comprises a disc formed with a nonradial slot.